April 7, 1953

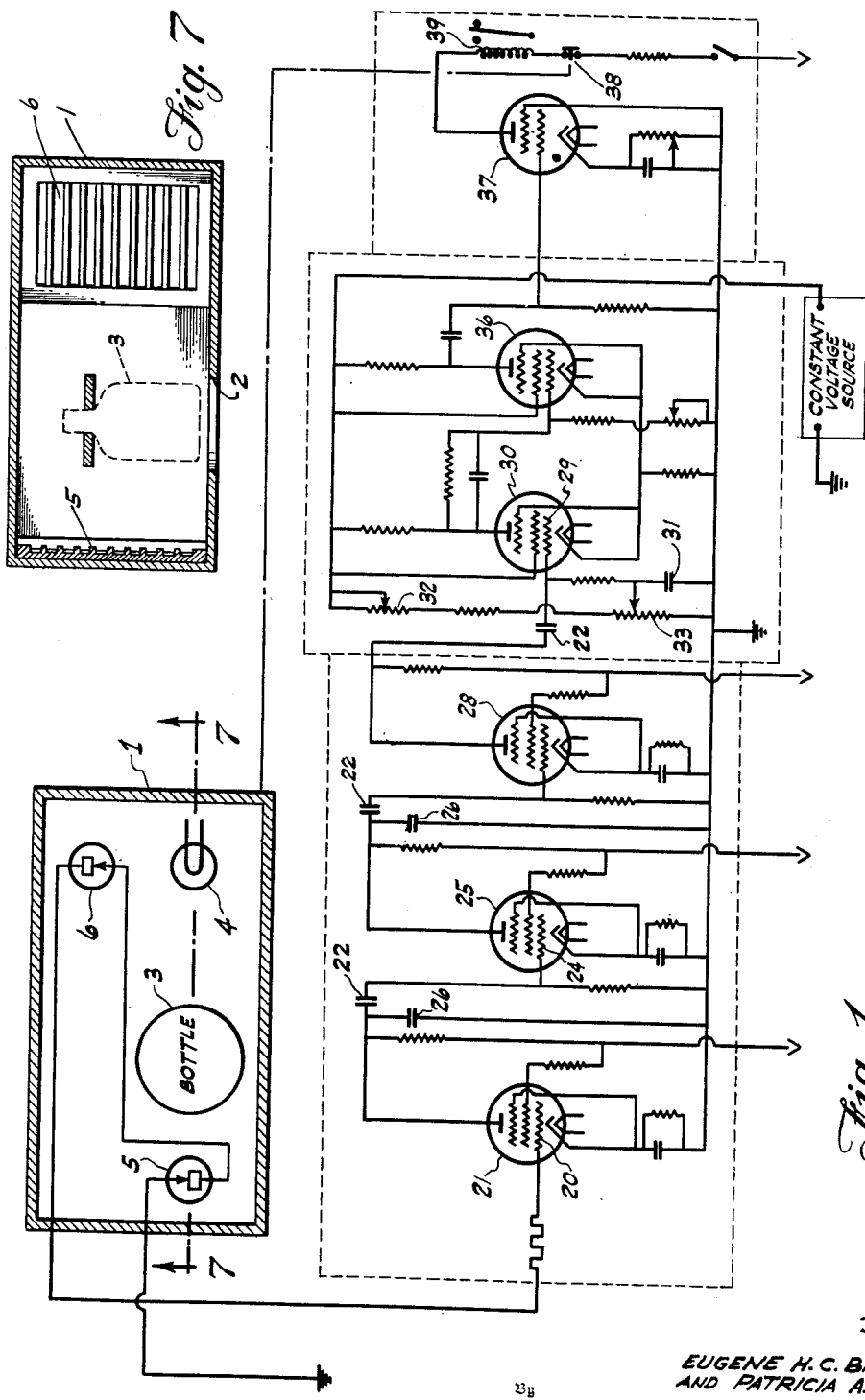

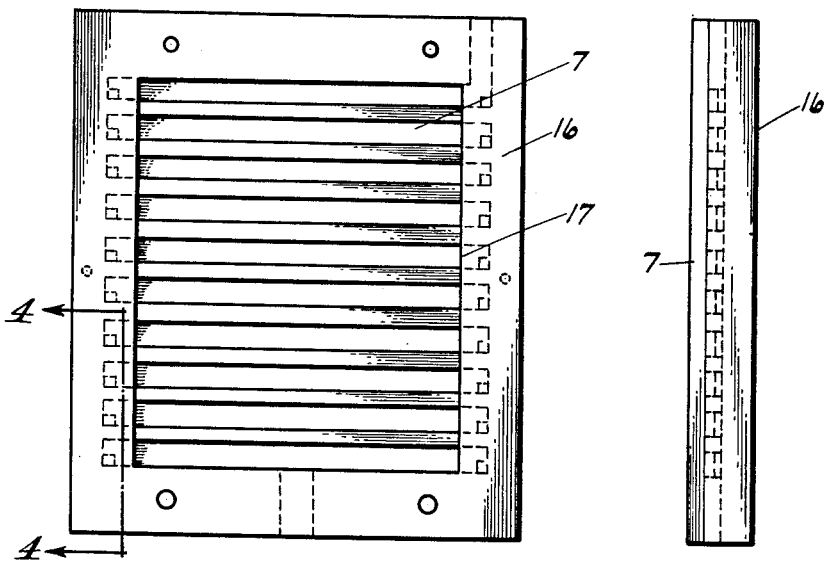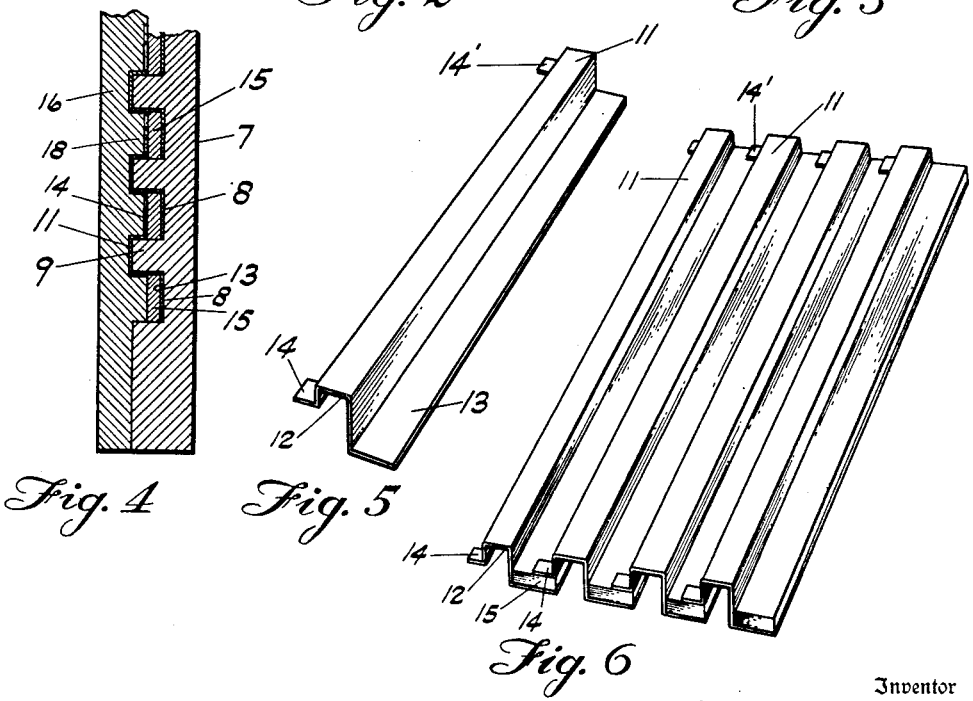

E. H. C. BROWN ET AL
METHOD AND APPARATUS FOR DETECTING
FOREIGN BODIES IN CONTAINERS 2,633,772

Filed Aug. 20, 1949

Inventor
EUGENE H. C. BROWN
AND PATRICIA A. RENNER

Arthur J Robert

Attorney

UNITED STATES PATENT OFFICE

2,633,772

METHOD AND APPARATUS FOR DETECTING FOREIGN BODIES IN CONTAINERS

Eugene H. C. Brown and Patricia A. Renner, Louisville, Ky., assignors to Joseph E. Seagram & Sons, Inc., Louisville, Ky., a corporation of Kentucky Application August 20, 1949, Serial No. 111,536

2 Claims. (Cl. 88—14)

The present invention relates to a detector method for discovering the presence of foreign bodies in a nonopaque zone, and to apparatus for performing the method.

Heretofore, the detection of foreign bodies in a nonopaque zone, such as in glass bottles and the like, has required personal observation, and thus not only is expensive, but is subject to human error. Automatically operated photoelectric means for this purpose has been of limited application because of the difficulty of locating a foreign body in the light stream and of distinguishing the photoelectric effect produced by one or a number of relatively small particles.

It is an object of the present invention to provide an apparatus and method for photoelectrically detecting the presence of foreign bodies in a nonopaque zone or area.

A further object is the provision of an apparatus which responds automatically to the presence of foreign matter in a nonopaque container, and which eliminates the effect of ambient influences external to the container.

A further object is the provision of an apparatus and process for detecting the presence of foreign matter in a nonopaque container, which compensates or eliminates the effects of variables, such as variations in light source and the filtering effect of the container walls.

In accordance with the present invention, there is provided a detector made up of a plurality of suitably connected self-generating photoelectric cells or units located to receive the rays of a light source. A bottle or other transparent container holding the liquid to be inspected, is interposed between the detector and light source, and the foreign material in the bottle is given a directed movement, as by inverting the bottle. The foreign material in the bottle is thus caused to fall through the bottle and traverse the space between the detector and light source, and the interruption of the light stream by the falling material, passing between the light source and successive cells, produces an electrical impulse in each photoelectric cell or unit which it traverses. These impulses occur at predetermined intervals by the arrangement of the photoelectric cells and spaces between the cells and the electrical connections of the cells so that they are combined to produce a single magnified or amplified impulse. This impulse may be amplified and is then employed to actuate a suitable indicating signal circuit, whereby the presence of foreign material in the bottle is indicated. By reason of the particular arrangement of the photoelectric cells in the detector circuit the apparatus can distinguish between a foreign particle in the bottle and a floating particle of the same size outside the bottle, because a particle outside the bottle produces a single impulse or a group of spaced impulses, whereas a particle in the bottle produces a single impulse in each cell which are added to form a single impulse of greatly increased amplitude. By electrically connecting the cells in series, or arranging the cells in parallel banks, each bank having its cells connected in series, the difficulties caused by ambient influences that produce single impulses are overcome, because in such arrangements the impulses caused by particles desired to be detected are additive.

Because of the relatively great sensitivity of this system in detecting the presence of moving foreign material between the light source and photoelectric detector, it is desirable to cut off or suppress the effect of impulses below the degree of sensitivity desired. This is provided by a suitable discriminator, preferably comprising a pair of vacuum tubes arranged so that when one is conducting the other is nonconducting. Thus, only a voltage impulse above a certain or predetermined amplitude produces an impulse in the output circuit of the discriminator, and the impulse thus produced is employed to actuate an indicator circuit. The discriminator may be adjustable so as to respond to impulses only higher than a certain maximum. Before passing to the discriminator, the impulses produced in the detector may be suitably amplified.

The effect of irregularities in the container walls interposed between the light source and the photoelectric detector is eliminated by inverting the light source, photoelectric detector and container together to impart the directed movement to the foreign particles, so that in inverted position the same relative influences are maintained. Ambient light effects may be eliminated by enclosing the apparatus in an inspection box to provide a light shield for the photoelectric detector. Compensation for variations in the light source is made by providing a second similar photoelectric detector positioned to receive light directly from the light source, and connected to the first photoelectric detector so that currents in the two detectors are substantially counteracted or bucked to provide a null bridge or constant voltage of any desired value. However, where the light source is uniform, so that no compensation therefor is required, a null bridge may be provided with any other source of potential, or the bucking potential may be omitted.

In this arrangement substantially all ambient influences on the photoelectric detector are eliminated except that due to floating dust in the air and falling particles in the container. Electrical impulses produced by the falling movement of foreign particles in the container, are of greater amplitude than the impulses produced by the movement of dust floating in the air. These impulses are amplified in a suitable type amplifier, and the amplified voltage then is passed to the discriminator which allows only impulses above a predetermined amplitude to pass therethrough or have an effect thereon. Thus, the effect of impulses of lesser amplitude produced by ambient conditions are eliminated, and the greater impulses are employed to energize a suitable signal circuit.

The preferred signal circuit includes a thyratron tube serving as a power amplifier, with its grid connected to receive the impulses from the discriminator. The flow of current in the thyratron plate circuit may be extinguished by a switch in the plate circuit which may be connected to the inspection box so as to be opened automatically when the inspection box is returned to upright position and is closed automatically when the box is inverted to condition the plate circuit for the next actuation. Any suitable arrangement, such as hydraulic or air cylinders operated by solenoid valves, may be provided to lock the container in the inspection box and rotate the box to invert the container.

In explaining the theory of operation of the invention, it should be pointed out that a self-generating photoelectric cell will convert the light falling thereon from a light source through a transparent or translucent container into electrical energy. Any foreign particles in the bottle or otherwise interposed between the light source and photoelectric cell that remain in the light beam will decrease the light falling on the photoelectric cell and this decreases the electrical energy generated in proportion to the area of the cell and the projected area of the foreign particle. Thus, small particles that remain in the light beam, whether moving or stationary, will cause a change of electrical energy from the cell which is an exceedingly small fraction of the electrical energy transmitted, and cannot be distinguished from the effect produced by air-borne dust in any practical way. However, a similar particle entering or leaving the light stream will produce an electrical impulse which is detected and employed to operate an indicator.

The electrical impulse produced by a particle entering and moving through the light stream will have a generating lag and a decay lag. By having the particles fall through the bottle, their rate of movement and direction become predetermined, and accordingly, photoelectric detector cells may be connected in series in such number that the impulse produced by the particle in the bottle entering on the second cell becomes cumulative to the impulse produced in the first cell, and so on. In this way, the electrical impulse produced by a moving particle in the bottle on each cell becomes cumulative and this results in an impulse of magnified amplitude. This amplitude reaches a maximum with a certain number of cells in series, and the addition of more cells in series up to a certain limit merely increases the duration of the impulse. The number of cells in series required to produce the maximum impulse depends on a number of factors, and can readily be determined for the conditions encountered for any particular installation. Also the duration of the impulse can be determined within limits by the number of cells in series. With this arrangement, ambient dust particles floating aimlessly in the air will produce a much lower amplitude impulse, because such particles travel at a lower speed and will cross less cells than the falling particles in the bottle, and as they will not intercept as great a number of cells as the falling particles in the bottle, they will not produce the cumulative current wave action of falling particles. The detector therefore will develop a high amplitude current impulse caused by falling particles in the bottle, and current impulses of lesser amplitude and duration caused by dust in the air. The discriminator serves to detect the high amplitude impulse, which are then employed to operate the indicator.

A feature of the invention which we believe is new, is the arrangement to produce an additive electrical impulse by the directed movement of foreign particles in a nonopaque region through a light stream falling on a self-generating photoelectric detector, comprising a plurality of cells, and the actuation or operation of a suitable signal by such electrical impulse.

The invention will be described in greater detail in connection with the accompanying drawings illustrating a preferred embodiment of the invention by way of example, and wherein:

Figure 1 is a diagrammatic view of an embodiment of the invention;

Figure 2 is an elevational view of a photoelectric screen and holder;

Figure 3 is an end view of Figure 2;

Figure 4 is a fragmentary section taken on line 4—4 of Figure 2;

Figure 5 is a perspective view of a contact element;

Figure 6 is a perspective view of a photoelectric screen without the holder;

Figure 7 is a section taken on line 7—7 of Figure 1, showing the box construction and screen arrangement;

Figure 8:
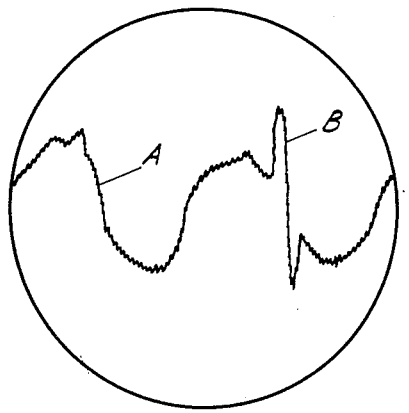
Figure 8 is an oscillograph showing the voltage impulses generated in the screen.

Referring to the drawing, there is provided an opaque enclosure or inspection box 1 having an opening 2 to receive a bottle 3 or other article to be inspected. A light source 4, which may be supplied by an incandescent lamp, is located in the box on one side of the bottle, and a pair of self-generating photoelectric detectors 5, 6 are positioned along adjacent walls. Detector 5 is located on the opposite side of the bottle from light source 4 so that the only light reaching this detector passes through the bottle. Detector 6 receives directly the light from source 4 and is electrically connected to detector 5 so that the voltage developed by the light source in one detector counteracts wholly or in part the voltage developed in the other detector.

The photoelectric detectors 5, 6 each comprises a plurality of photoelectric units or cells electrically connected together, and as they are alike in construction, only one will be described in detail. Detector 5 comprises a backing plate 7 (Figure 2) of electrical insulation material having transverse grooves 8 therein separated by ribs 9. A contact member 11 of conducting material provides a channel portion 12 covering a rib 9, a shelf 13 received in the bottom of a groove 8, and tabs 14, 14' overlying the next adjacent groove 8. Contact member 11 is of springy conducting material, such as Phosphor bronze. Each unit or cell comprises a thin strip 15 of a selenium or other type self-generating cell (Figures 4 and 6), which is placed on a shelf 13 so as to be in electrical contact therewith, and tabs 14, 14' connect the strips or cells together in series. In the preferred construction we employ ten cells each being one fourth inch high, but any desired number of cells of the desired height and length may be employed.

A cover frame 16 is provided with an aperture or window 17, and has short ribs 18. In assembled position the ribs 18 are received between the ribs 9 of the backing plate 7 so as to engage the tabs 14, 14', and thus hold the cells 15 and contact members 11 together. The cover frame and backing plate are held assembled by bolts or in any other suitable manner, and the window allows light from source 4 to fall upon the cells. When exposed to light an electrical impulse is developed in each unit or cell which impulses become cumulative by having the proper number of cells connected in series.

The photoelectric detectors 5, 6 and light source 4 are mounted in the box 1 so as to be movable therewith, and upon inserting a bottle to be inspected, the box is inverted, manually or automatically. Any particles in the bottle thus fall substantially together and successively interrupt the light streams falling on the photoelectric cells. A succession of cumulative current impulses thus is generated, the duration of the cumulative impulse being dependent on the number of cells in series, and other factors. Because there is no movement of the bottle relative to the light source, the effect of the glass bottle on the photoelectric screen 5 is constant. Also, because of the electrical connection of the two photoelectric detectors in opposing relation, variations in the light source are neutralized. The presence of dust in the air between the cells and the light source produces small current impulses which are eliminated, as will later be explained.

The current pulses produced in photoelectric detector 5 by dust in the air and by moving particles in the bottle are transmitted to the grid 20 of an audion amplifier tube 21. A constant plate voltage is supplied at V from any suitable source of direct voltage. The amplified impulses in the current pass through condenser 22 which blocks direct current, to the grid 24 of audion 25 for further amplification. The amplifier is designed for optimum operation on impulses of the duration produced by falling particles in the bottle, so that impulses produced by floating dust are not amplified as much. The condenser 26 connected to ground filters out alternating current in the plate circuit. If desired, the impulses may be amplified again by audion 28 similarly connected to audion 25. Any desired amount of amplification may be employed. With three stages of amplification as illustrated the unidirectional current impulses can be amplified 64,000 times, while the impulses of lower amplitude caused by adventitious dust particles in the air, are amplified less.

The impulse from the last audion 28 now passes through a condenser 22, which blocks direct current, to the discriminator. The tubes 30, 36 of the discriminator have their plates connected through suitable resistances to a constant voltage source, and the control grid of audion 36 is connected by a voltage divider comprising a resistor and condenser in parallel, to the plate of audion 30. Adjustable resistors 32, 33 preferably are of the temperature compensated type and are adjusted to secure the desired plate and grid voltages. Condenser 31 bleeds off generated high frequency voltage and prevents oscillation in the plate circuits. When tube 30 is adjusted to be conducting, tube 36 is nonconducting. The low amplitude impulses impressed on grid 29, caused by dust in the air or other ambient conditions, are insufficient to render tube 30 nonconducting. However, the higher amplitude impulse caused by foreign matter in a bottle being inspected renders tube 30 nonconducting, so that the grid voltage of tube 36 renders that tube conducting to pass a current impulse. This impulse is applied to the grid of the thyratron 37 which serves as a power amplifier to operate the relay 39. The relay may operate a visible or audible signal to show the presence of particles in the bottle, or may operate bottle ejecting mechanism, to reject bottles containing foreign matter, or can serve in other ways to distinguish bottles having particles therein. The dot and dash line between box 1 and microswitch 38 diagrammatically shows they are interconnected mechanically.

In operating the inspection device, a bottle to be inspected is placed in the housing 1, and the housing and bottle, as well as the light source and photoelectric detectors are inverted, which causes any sediment in the bottle to descend through the liquid in the bottle. As bubbles passing between the photoelectric detector and the light source would develop current pulses in the photoelectric detector, the detectors 5, 6 are made smaller than the bottle to be inspected. Thus, as the bottle is turned slowly the bubbles remain at the top of the liquid and do not come between the detector and light source, and thus produce no effect. Also, as the light source, photoelectric detector and bottle are rotated as a unit, the effect of the glass of the bottle remains constant. Thus, the conductivity of the detector strips in the screen responds only to variable factors; namely, the dust in the air, and foreign particles in the liquid.

As the foreign particles in the liquid descend or settle they come between the light source and successive detector strips which are connected in series, and thus produce a cumulative succession of current pulses of relatively high amplitude. On the other hand, dust particles in the air move in no particular direction, and thus produce current pulses of a smaller amplitude. The current developed in the detector therefor comprises impulses of low and high amplitudes. The amplifier tubes 21, 25 and 28 amplify the voltage of all the impulses in several stages. The number of stages of amplification will depend on the desired total amplification, and the properties of the amplifiers employed.

The amplified current now passes to the discriminator circuit. The discriminator can be set to be operated at any desired amplitude so as to indicate the presence of foreign matter in the bottle only. Microswitch 38 is arranged to be closed only when box 1 is in inverted position. When an impse from tube 36 reaches the grid of thyratron 37, the thyratron is fired and its plate current energizes relay 39 to operate a signal or an ejection apparatus. When the box 1 is restored to normal positions switch 38 is opened to break the plate circuit of the thyratron and extinguish the tube. Thereafter switch 38 is closed by inverting the box to condition the thyratron for the next operation.

Figure 9:
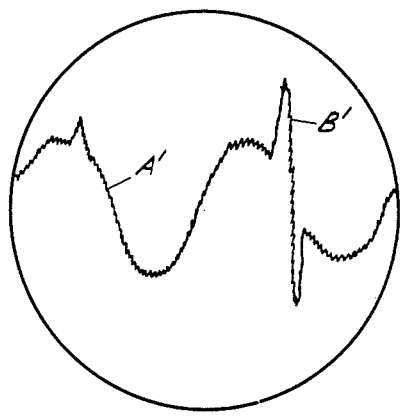
Figure 9 is an oscillograph showing the effect of amplification.
Figure 10:
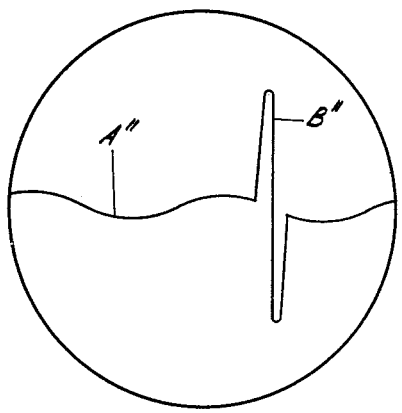
Figure 10 is an oscillograph showing the effect of the discriminator.

The mode of operation of the invention will be made more clear by reference to Figures 8 to 10 which show oscillograph views of voltages produced, superposed on a sixty cycle alternating frequency. In Figure 8, the wavy line A represents a sixty cycle alternating voltage, and the small irregularities represent the effect of dust in the air as generated in the photoelectric detector. The large impulse B represents the effect produced by a particle in the bottle. After this voltage has been amplified, as shown in Figure 9, the curve A' shows the alternating frequency curve smoothed somewhat, and the curve B' maintains its prominence. In the discriminator, as shown in Figure 10, the irregularity of curve A'' has been completely suppressed and only the prominence B'' remains, which is due to the particle in the bottle. This wave B'' then energizes the grid of the thyratron. In actual operation the line A would be a horizontal fuzzy line, because the photoelectric detector generates unidirectional current in the arrangement shown.

Figure 11:
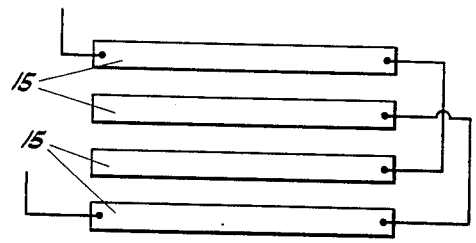
Figure 11 is a diagrammatic view of a modification.

If desired, alternate strips 15 of detectors may be connected as diagrammatically shown in Figure 11 so as to produce an alternating current by the movement of dust and foreign particles. In this modification the differences between ambient dust and particles is not as pronounced. Various other modifications may be made in the invention without departing from the spirit or scope thereof.

We claim as our invention:

1. The method of detecting the presence of foreign bodies in a nonopaque zone, which comprises: directing a stream of light upon a photoelectric detector comprising a plurality of cells arranged in a file; interposing a nonopaque container to be inspected between the light source and detector; inverting the container, light source and detector together to cause foreign bodies in the container to traverse the liquid with a directed motion in a path interrupting the light falling on successive cells to develop additive electrical impulses; and actuating an indicator by said impulses.

2. An apparatus for detecting the presence of foreign substances in a non-opaque container comprising: a light source; a generating photoelectric detector; an invertible enclosure for said light source and detectors adapted to receive a non-opaque container to be inspected between said light source and detector; said detector comprising a plurality of cells arranged in a vertical row so that a particle falling through the container interrupts the light passing through the container on successive cells; means electrically connecting said cells to develop additive current impulses on said passing of the particle in the container across the light source; and indicator means operated by impulses developed in the photoelectric cells to show the presence of foreign material in a container.

EUGENE H. C. BROWN.
PATRICIA A. RENNER.

REFERENCES CITED

The following references are of record in the file of this patent:

UNITED STATES PATENTS

| Number | Name | Date |
|---|---|---|
| 1,940,882 | Rich | Dec. 26, 1933 |
| 2,015,675 | Hays | Oct. 1, 1935 |
| 2,016,036 | Fitzgerald | Oct. 1, 1935 |
| 2,412,822 | Malter | Dec. 17, 1946 |
| 2,439,490 | Schell | Apr. 13, 1948 |
| 2,446,628 | Brown | Aug. 10, 1948 |
| 2,491,189 | Long | Dec. 13, 1949 |
| 2,520,932 | Hoeppner | Sept. 5, 1950 |